(12) United States Patent
Xu

(10) Patent No.: US 10,437,752 B2
(45) Date of Patent: Oct. 8, 2019

(54) METHOD FOR ESTABLISHING CONNECTION BETWEEN DEVICES HAVING UNIVERSAL SERIAL BUS USB TYPE-C INTERFACES, AND TERMINAL DEVICE

(71) Applicant: HUAWEI TECHNOLOGIES CO., LTD., Shenzhen, Guangdong (CN)

(72) Inventor: Zhongjie Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/083,602

(22) PCT Filed: Mar. 11, 2016

(86) PCT No.: PCT/CN2016/076173
§ 371 (c)(1),
(2) Date: Sep. 10, 2018

(87) PCT Pub. No.: WO2017/152424
PCT Pub. Date: Sep. 14, 2017

(65) Prior Publication Data
US 2019/0129872 A1    May 2, 2019

(51) Int. Cl.
*G06F 13/20* (2006.01)
*G06F 13/42* (2006.01)
*G06F 13/40* (2006.01)

(52) U.S. Cl.
CPC .......... *G06F 13/20* (2013.01); *G06F 13/4068* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 10,122,576 B2 * | 11/2018 | Bhesania | ............ H04L 41/0803 |
| 2015/0268688 A1 * | 9/2015 | Leinonen | ............... G06F 13/409 |
| | | | 307/147 |

(Continued)

FOREIGN PATENT DOCUMENTS

| | | |
|---|---|---|
| CN | 105224494 A | 1/2016 |
| CN | 105375207 A | 3/2016 |

(Continued)

OTHER PUBLICATIONS

Aaron Tao et al. Enabling new USB Connectivity Scenarios. Winhec shenzhen2015. XP055525681, total 33 pages.

(Continued)

*Primary Examiner* — Michael Sun
(74) *Attorney, Agent, or Firm* — Fish & Richardson P.C.

(57) ABSTRACT

A method for establishing a connection between devices having USB Type-C interfaces includes that: a first device determines that a USB cable is connected to a USB Type-C interface; determines a role configuration type supported by a second device; establishes a first USB connection to the second device; displays role information that is of the first device and the second device during establishment of the first USB connection and role configuration types supported by the first device and the second device; receives role configuration information of a user of the first device; and establishes a second USB connection to the second device according to the role configuration information.

14 Claims, 6 Drawing Sheets

(56) References Cited

U.S. PATENT DOCUMENTS

| | | | | |
|---|---|---|---|---|
| 2016/0342492 A1* | 11/2016 | Chen | ............... | G06F 13/385 |
| 2017/0147526 A1* | 5/2017 | Chen | ............... | G06F 13/4282 |
| 2017/0358895 A1* | 12/2017 | Chung | ............... | H01R 13/6272 |
| 2018/0081843 A1* | 3/2018 | Kadgi | ............... | G06F 9/4411 |
| 2018/0089123 A1* | 3/2018 | Kulkarni | ............... | G06F 13/385 |
| 2018/0336159 A1* | 11/2018 | Kung | ............... | G06F 13/4282 |
| 2019/0042503 A1* | 2/2019 | Montero | ............... | G06F 13/385 |
| 2019/0073329 A1* | 3/2019 | Tao | ............... | G06F 5/065 |

FOREIGN PATENT DOCUMENTS

| | | | |
|---|---|---|---|
| EP | 3361582 A1 | 8/2018 | |
| WO | 2015184994 A1 | 12/2015 | |

OTHER PUBLICATIONS

Aaron Tao et al. Enabling new USB Connectivity Scenarios(slide 27 in chinese), Winhec shenzhen2015. XP055525685. total two pages. With English translation.

Aaron Tao et al. Enabling new USB Connectivity Scenarios. Winhec shenzhen2015. XP055525686, from the internet:https://channel9.msdn.com/Events/WinHEC/2015/WHT200. 1 page.

Google: Machine translation,Nov. 21, 2018. Retrieved from the Internet:translate.google.com {retrieved on Nov 21, 2018}.1 page. XP055525679.

Anwar Sadat: ""Low-cost implementation of USB Type-CTM"", Texas Instruments. Jul. 3, 2015. Total 8 pages. XP055507205.

Extended European Search Report issued in European Application No. 16893073.3 dated Nov. 30, 2018, 10 pages.

International Search Report and Written Opinion issued in International Application No. PCT/CN2016/076173 dated Nov. 14, 2016, 18 pages.

\* cited by examiner

Solution 1

Solution 2

METHOD FOR ESTABLISHING CONNECTION BETWEEN DEVICES HAVING UNIVERSAL SERIAL BUS USB TYPE-C INTERFACES, AND TERMINAL DEVICE

CROSS-REFERENCE TO RELATED APPLICATIONS

This application is a national Stage of International Application No. PCT/CN2016/076173, filed on Mar. 11, 2016, which is hereby incorporated by reference in its entirety.

TECHNICAL FIELD

The present invention relates to the communications field, and more specifically, to a method for establishing a connection between devices having Universal Serial Bus (USB) Type-C interfaces, and a terminal device.

BACKGROUND

A biggest feature of a Universal Serial Bus (English full name: Universal Serial Bus, USB for short) Type-C interface is that the USB interface supports double-sided insertion, resolving a problem of "inaccurate insertion of USB". Devices having USB Type-C interfaces may be classified, based on role configuration types supported by the devices, into a downstreaming facing port (English full name: Downstreaming Facing Port, DFP for short) device, an upstreaming facing port (English full name: Upstreaming Facing Port, UFP for short) device, and a dual role port (English full name: Dual Role Port, DRP for short) device. The USB Type-C specification stipulates that a DRP device may be configured as a DFP device or a UFP device based on a role of a peer end device during device connection establishment. Therefore, based on the USB Type-C specification, when two DRP devices having USB Type-C interfaces are connected to each other, whether each of the devices is configured as a DFP device or a UFP device is random. However, the randomness may lead to some cases against common sense. For example, a user wants to charge, by using a tablet computer at a relatively high battery level, a mobile phone at a relatively low battery level. However, because the two devices are both DRP devices, random role allocation leads to an "awkward situation" in which the mobile phone at a relatively low battery level charges the tablet computer at a relatively high battery level.

To avoid such an inappropriate scenario in which "a mobile phone charges a notebook computer", the USB Type-C specification defines two extended roles of the DRP: Try.SNK (trying to be a UFP device) and Try.SRC (trying to be a DFP device). It is expected to avoid the foregoing "awkward situation" by configuring computers and notebook computers as Try.SRC roles and configuring mobile phones and tablet computers as Try.SNK roles. However, when a tablet computer is connected to a mobile phone, or mobile phones are connected to each other, because they are both Try.SNK devices, there is still an awkward situation in which "a device at a relatively low battery level charges a device at a relatively high battery level".

SUMMARY

Embodiments of the present invention provide a method for establishing a connection between devices having Universal Serial Bus (USB) Type-C interfaces, and a terminal device, to avoid an awkward situation in which "a device at a relatively low battery level charges a device at a relatively high battery level".

According to a first aspect, a method for establishing a connection between devices having Universal Serial Bus (USB) Type-C interfaces is provided. The method includes: determining, by a first device, that a USB cable is connected to a USB Type-C interface of the first device, where a first USB plug of the USB cable is inserted into the USB Type-C interface of the first device, and a second USB plug of the USB cable is inserted into a USB Type-C interface of the second device; determining, by the first device, a role configuration type supported by the second device, where the role configuration type is one of the following: a dual role port (DRP) device, a downstreaming facing port (DFP) device, or an upstreaming facing port (UFP) device; establishing, by the first device, a first USB connection to the second device; displaying, by the first device, role information that is of the first device and the second device during establishment of the first USB connection and role configuration types supported by the first device and the second device; receiving, by the first device, role configuration information of a user of the first device, where the role configuration information instructs the user of the first device to choose to change the role information that is of the first device and the second device during establishment of the first USB connection; and establishing, by the first device, a second USB connection to the second device by using changed role information. In this implementation, the first device may try to establish the first USB connection to the second device after determining the role configuration types of the first device and the second device, and display, to the user of the first device, the role information that is of the first device and the second device during connection establishment. The user of the first device may determine, based on the displayed role information that is of the first device and the second device during connection establishment and the role configuration types supported by the first device and the second device, to maintain or change the role information of the first device and the second device. If the user of the first device determines to maintain the role information of the first device and the second device, the first device may maintain the first USB connection. Otherwise, if the user of the first device determines to change the role information of the first device and the second device, the first device may establish the second USB connection to the second device based on the changed role information.

With reference to the first aspect, in a first implementation of the first aspect, the determining, by the first device, a role configuration type supported by the second device includes: determining, by the first device, that the second device is connected to the USB Type-C interface of the first device; determining, by the first device based on voltages that are on a configuration channel CC pin of the USB Type-C interface of the first device within a preset time, the role configuration type supported by the second device; and if levels of the voltages within the preset time are high levels, determining that the role configuration type supported by the second device is a DFP device; or if levels of the voltages within the preset time are low levels, determining, by the first device, that the second device is a UFP device; or if levels of the voltages within the preset time are variable levels, determining that the role configuration type supported by the second device is a DRP device. In this implementation, the first device may first determine that the second device is connected to the USB Type-C interface of the first device, and then determine the role configuration type of the second device based on a voltage status on the CC pin of the USB Type-C interface of the first device.

With reference to the first aspect, in a second implementation of the first aspect, the determining, by the first device, a role configuration type supported by the second device includes: determining, by the first device based on voltages that are on a configuration channel CC pin of the USB Type-C interface of the first device within a preset time, the role configuration type supported by the second device; and if levels of the voltages within the preset time are high levels, determining that the role configuration type supported by the second device is a DFP device; or if levels of the voltages within the preset time are low levels, determining, by the first device when determining that the second device is connected to the USB Type-C interface of the first device, that the second device is a UFP device; or if levels of the voltages within the preset time are variable levels, determining that the role configuration type supported by the second device is a DRP device. In this implementation, the first device may determine, based on the voltages on the CC pin of the USB Type-C interface of the first device, the role configuration type supported by the second device. When the levels of the voltages on the CC pin are low levels, the levels of the voltages on the CC pin are low levels in two cases. In one case, the second device is not connected to the USB Type-C interface of the first device. In the other case, the connected second device is a UFP device, and therefore, the first device further needs to determine whether the second device is connected to the USB Type-C interface of the first device, and when determining that the second device is connected to the USB Type-C interface, further determines that the role configuration type supported by the second device is a UFP device.

With reference to the first implementation of the first aspect and the second implementation of the first aspect, in a third implementation of the first aspect, the method further includes: keeping, by the first device within the preset time, configuration channel CC pins of the USB Type-C interface being disconnected from a Type-C controller of the first device; and connecting, by the first device, the CC pins of the USB Type-C interface and the Type-C controller after the preset time expires. In this implementation, the preset time is a detection time in which the first device detects the voltages on the CC pin, and a processor of the first device keeps, within the preset time, the CC pins being disconnected from the Type-C controller. In this way, the first device and the second device are not connected to each other, and the first device may obtain a voltage feature of the CC pin when no connection is established. After detecting voltages on two CC pins, the first device connects the CC pins of the USB Type-C interface and the Type-C controller, so that the first device and the second device can establish a USB connection.

With reference to the first aspect and the foregoing implementations, in a fourth implementation of the first aspect, the determining, by a first device, that a USB cable is connected to a USB Type-C interface of the first device includes: if a level on a first ground pin of the USB Type-C interface of the first device changes from a first level to a second level, determining, by the first device, that the USB cable is connected to the USB Type-C interface, where the first level is higher than the second level, one terminal of the first ground pin is connected to the first level and one terminal of a switch, and the other terminal of the switch is connected to the second level; or if an infrared receiving apparatus in the USB Type-C interface of the first device cannot receive light emitted by an infrared emission apparatus, determining, by the first device, that the USB cable is connected to the USB Type-C interface of the first device. In this implementation, the first device may determine, based on a change status of the level on the first ground pin of the USB Type-C interface, whether a cable is connected to the USB Type-C interface. Specifically, the first level is a high level, and the second level is a low level. If the level on the first ground pin changes from the high level to the low level, it may be determined that the USB cable is connected to the USB Type-C interface of the first device. Alternatively, a set of infrared emission apparatus and infrared receiving apparatus may be disposed on the USB Type-C interface, and when the infrared receiving apparatus cannot receive light emitted by the infrared emission apparatus, it is determined that the USB cable is connected to the USB Type-C interface of the first device.

According to a second aspect, a terminal device is provided. The terminal device includes: a determining module, configured to: determine that a USB cable is connected to a USB Type-C interface of the terminal device, where a first USB plug of the USB cable is inserted into the USB Type-C interface of the terminal device, and a second USB plug of the USB cable is inserted into a USB Type-C interface of a second device; and determine a role configuration type supported by the second device, where the role configuration type is one of the following: a dual role port (DRP) device, a downstreaming facing port (DFP) device, or an upstreaming facing port (UFP) device; a processing module, configured to establish a first USB connection to the second device; an output module, configured to display role information that is of the terminal device and the second device during establishment of the first USB connection and role configuration types supported by the terminal device and the second device; and an input module, configured to receive role configuration information of a user of the terminal device, where the role configuration information instructs the user of the terminal device to choose to change the role information that is of the terminal device and the second device during establishment of the first USB connection, where the processing module is further configured to: when the role configuration information instructs to change the role information of the terminal device and the second device, establish a second USB connection to the second device by using changed role information.

With reference to the second aspect, in a first implementation of the first aspect, the determining module is specifically configured to: determine that the second device is connected to the USB Type-C interface of the terminal device; determine, based on voltages that are on a configuration channel CC pin of the USB Type-C interface of the terminal device within a preset time, the role configuration type supported by the second device; and if levels of the voltages within the preset time are high levels, determine that the role configuration type supported by the second device is a DFP device; or if levels of the voltages within the preset time are low levels, determine that the role configuration type supported by the second device is a UFP device; or if levels of the voltages within the preset time are variable levels, determine that the role configuration type supported by the second device is a DRP device.

With reference to the second aspect, in a second implementation of the first aspect, the determining module is specifically configured to: determine, based on voltages that are on a configuration channel CC pin of the USB Type-C interface of the terminal device within a preset time, the role configuration type supported by the second device; and if levels of the voltages within the preset time are high levels, determine that the role configuration type supported by the second device is a DFP device; or if levels of the voltages within the preset time are low levels, determine, when it is determined that the second device is connected to the USB Type-C interface of the terminal device, that the second device is a UFP device; or if levels of the voltages within the preset time are variable levels, determine that the role configuration type supported by the second device is a DRP device.

With reference to the first implementation of the second aspect and the second implementation of the second aspect, in a third implementation of the second aspect, the processing module is further configured to: keep, within the preset time, configuration channel CC pins of the USB Type-C interface of the terminal device being disconnected from a Type-C controller of the terminal device; and after the preset time expires, control the CC pins of the USB Type-C interface to connect to the Type-C controller.

With reference to the second aspect and the foregoing implementations, in a fourth implementation of the second aspect, the determining module is specifically configured to: when a level on a first ground pin of the USB Type-C interface of the terminal device changes from a first level to a second level, determine that the USB cable is connected to the USB Type-C interface, where the first level is higher than the second level, one terminal of the first ground pin is connected to the first level and one terminal of a switch, and the other terminal of the switch is connected to the second level; or when an infrared receiving apparatus in the USB Type-C interface of the terminal device cannot receive light emitted by an infrared emission apparatus, determine that the USB cable is connected to the USB Type-C interface of the terminal device.

According to a third aspect, a terminal device is provided. The terminal device includes a processor, a storage, a USB Type-C interface, an input unit, and an output unit. The processor is configured to determine that a USB cable is connected to the USB Type-C interface, where a first USB plug of the USB cable is inserted into the USB Type-C interface of the terminal device, and a second USB plug of the USB cable is inserted into a USB Type-C interface of a second device. The processor is further configured to determine a role configuration type supported by the second device, where the role configuration type is one of the following: a dual role port (DRP) device, a downstreaming facing port (DFP) device, or an upstreaming facing port (UFP) device. The processor is further configured to establish a first USB connection to the second device. The output unit is configured to display role information that is of the terminal device and the second device during establishment of the first USB connection and role configuration types supported by the terminal device and the second device. The input unit is configured to receive role configuration information of a user of the terminal device, where the role configuration information instructs the user of the terminal device to choose to change the role information that is of the terminal device and the second device during establishment of the first USB connection. The processor is further configured to: when the role configuration information instructs to change the role information of the terminal device and the second device, establish a second USB connection to the second device by using changed role information.

With reference to the third aspect, in a first implementation of the third aspect, the processor is specifically configured to: determine that the second device is connected to the USB Type-C interface of the terminal device; determine, based on voltages that are on a configuration channel CC pin of the USB Type-C interface of the terminal device within a preset time, the role configuration type supported by the second device; and if levels of the voltages within the preset time are high levels, determine that the role configuration type supported by the second device is a DFP device; or if levels of the voltages within the preset time are low levels, determine that the role configuration type supported by the second device is a UFP device; or if levels of the voltages within the preset time are variable levels, determine that the role configuration type supported by the second device is a dual role port device.

With reference to the third aspect, in a second implementation of the third aspect, the processor is specifically configured to: determine, based on voltages that are on a configuration channel CC pin of the USB Type-C interface of the terminal device within a preset time, the role configuration type supported by the second device; and if levels of the voltages within the preset time are high levels, determine that the role configuration type supported by the second device is a DFP device; or if levels of the voltages within the preset time are low levels, determine, when it is determined that the second device is connected to the USB Type-C interface of the terminal device, that the second device is a UFP device; or if levels of the voltages within the preset time are variable levels, determine that the role configuration type supported by the second device is a DRP device.

With reference to the first implementation of the third aspect and the second implementation of the third aspect, in a third implementation of the third aspect, the processor is further configured to: keep, within the preset time, configuration channel CC pins of the USB Type-C interface being disconnected from the Type-C controller; and connect the CC pins of the USB Type-C interface and the Type-C controller after the preset time expires.

With reference to the third aspect and the foregoing implementations, in a fourth implementation of the third aspect, the processor is further configured to: when a level on a first ground pin of the USB Type-C interface of the terminal device changes from a first level to a second level, determine that the USB cable is connected to the USB Type-C interface, where the first level is higher than the second level, one terminal of the first ground pin is connected to the first level and one terminal of a switch, and the other terminal of the switch is connected to the second level; or when an infrared receiving apparatus in the USB Type-C interface of the terminal device cannot receive light emitted by an infrared emission apparatus, determine that the USB cable is connected to the USB Type-C interface of the terminal device.

According to a fourth aspect, a computer-readable storage medium storing one or more programs is provided. The one or more programs are used by the terminal device to perform the method provided in the first aspect or any implementation of the first aspect.

Based on the foregoing technical solutions, according to the method for establishing a connection between devices having Universal Serial Bus (USB) Type-C interfaces, and the terminal device in the embodiments of the present invention, the first device may display, to the user, the role configuration types of the first device and the connected second device and the role information that is of the first device and the second device during establishment of the first USB connection, so that the user chooses, based on battery level statuses of the devices, to maintain or change the role information of the devices. Therefore, an "awkward situation" in which a device at a relatively low battery level charges a device at a relatively high battery level due to random role allocation can be avoided.

According to a fifth aspect, a method is provided. The method includes: determining, by a first device, that a USB cable is connected to a USB Type-C interface of the first device; determining, by the first device, a role configuration type supported by a second device, where a USB Type-C interface of the second device is connected to the USB Type-C interface of the first device by using the other terminal of the USB cable; and establishing, by the first device, a USB connection to the second device based on a role configuration type supported by the first device and the role configuration type supported by the second device, where each role configuration type is one of the following: a dual role port device, a downstreaming facing port DFP device, or an upstreaming facing port UFP device. In this implementation, when a cable is connected to the USB Type-C interface of the first device, the first device can determine the role configuration type supported by the connected second device, and establish the USB connection between the devices based on the role configuration types of the first device and the second device. Therefore, the established USB connection between the devices is not blind, so that an "awkward situation" in which a device at a relatively low battery level charges a device at a relatively high battery level due to random role allocation can be avoided.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, user equipment (User Equipment, UE) may also be referred to as a mobile terminal (Mobile Terminal), mobile user equipment, a terminal device, and the like, and includes but is not limited to a mobile station (Mobile Station, MS), a mobile terminal (Mobile Terminal), a mobile telephone (Mobile Telephone), a handset (handset), and portable equipment (portable equipment). The user equipment may communicate with one or more core networks by using a radio access network (Radio Access Network, RAN). For example, the user equipment may be a mobile telephone (or referred to as a "cellular" telephone), or a computer having a wireless communication function; or the user equipment may be a portable, pocket-sized, handheld, computer built-in, or in-vehicle mobile apparatus.

In the prior art, when two DRP devices establish an inter-device connection, for example, a tablet computer and a mobile phone establish a connection, or a mobile phone and a mobile phone establish a connection, there may be an awkward situation in which "a device at a relatively low battery level charges a device at a relatively high battery level". The embodiments of the present invention disclose a method for establishing a connection between devices having USB Type-C interfaces, so that when two devices establishing a device connection are both DRP devices, role types of the two devices are configured based on selection of users using the two devices, thereby avoiding the foregoing awkward situation.

Figure 1:
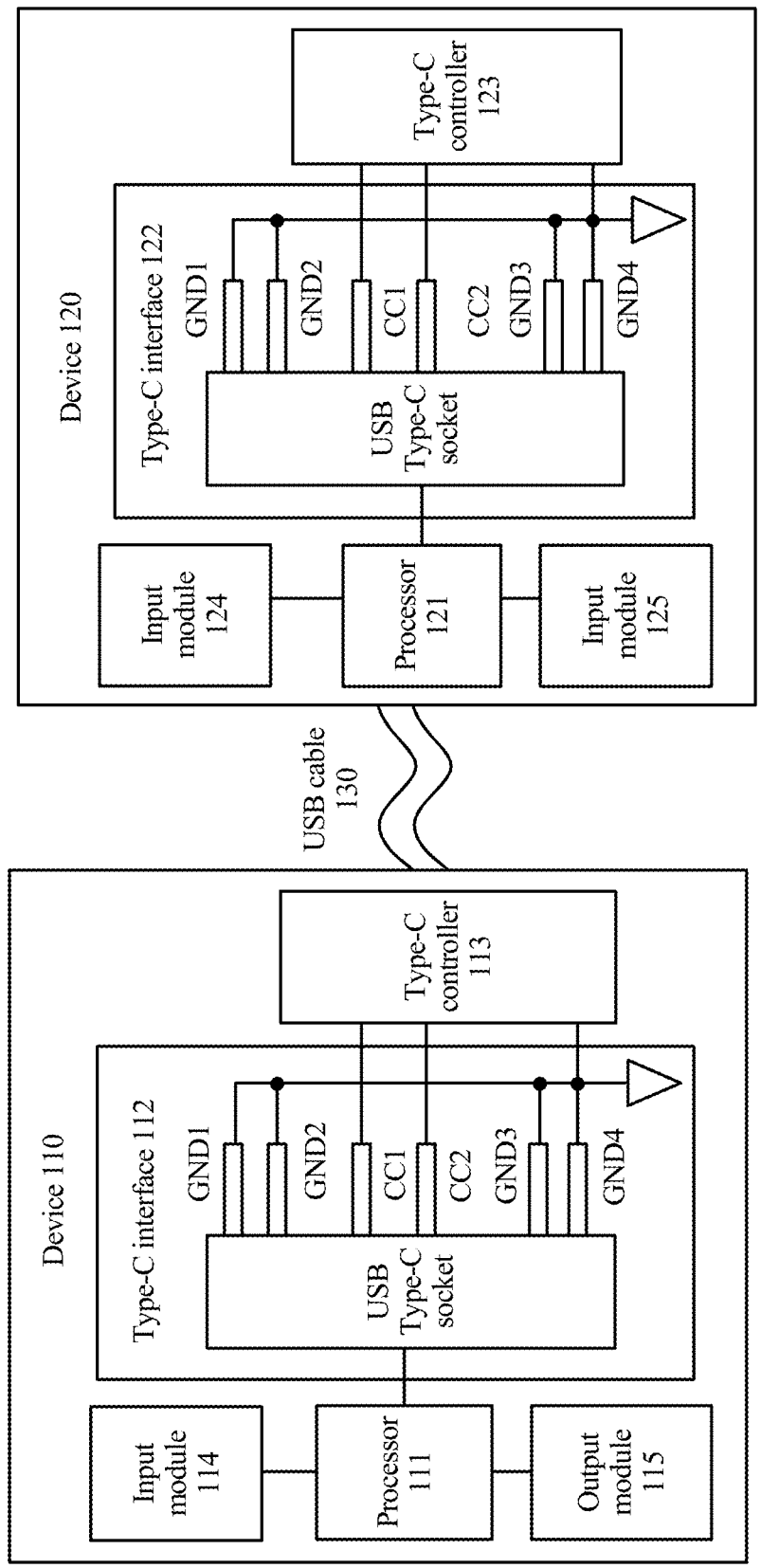
FIG. 1 is a schematic diagram of a typical application scenario according to embodiments of the present invention.

An application scenario of the embodiments of the present invention is first described before the method for establishing a connection between devices having USB Type-C interfaces in the embodiments of the present invention is described. FIG. 1 is a schematic diagram of an application scenario according to the embodiments of the present invention. It should be understood that FIG. 1 is only an illustration drawing for ease of understanding, but does not limit the protection scope of the embodiments of the present invention.

As shown in FIG. 1, a device 110 and a device 120 are both devices having USB Type-C interfaces. The USB Type-C interface of the device 110 and the USB Type-C interface of the device 120 may establish a USB connection between the device 110 and the device 120 by using a USB cable 130.

The device 110 or the device 120 may be a mobile terminal, for example, a mobile phone (or referred to as a "cellular" phone), or may be a computer having a wireless communication function, for example, a portable, pocket-sized, handheld, computer built-in, or in-vehicle mobile apparatus such as a PDA, a dedicated media player, or a consumer electronic device.

The device 110 may include a processor 111, a USB Type-C interface 112, a Type-C controller 113, an input module 114, and an output module 115.

The processor 111 may be configured to control receiving and processing of input and output data between components in the device 110. The processor may be implemented on a single chip, a plurality of chips, or a plurality of electronic elements, may use a plurality of architectures, and include a dedicated or embedded processor, a dedicated processor, a controller, an ASIC, or the like.

The USB Type-C interface 112 includes a USB Type-C socket, and a plurality of pins are disposed in the USB Type-C socket, and include a plurality of ground pins (including GND1 to GND4) and configuration channel (English full name: Configuration Channel, CC for short) pins including a CC1 pin and a CC2 pin. The CC1 or CC2 pin of the USB Type-C interface 112 is configured to implement a configuration channel function defined in the USB Type-C specification and a function stipulated in the USB power delivery (English full name: Power Delivery, PD for short) specification. A role type of the USB Type-C interface includes a dual role port DRP, a downstreaming facing port DFP, and an upstreaming facing port UFP. The DFP may be considered as a primary device, and the UFP may be considered as a secondary device. When the USB Type-C interface 112 is configured as a DFP, a role of the device 110 is a primary device, and the device 110 may supply power to a secondary device. Otherwise, when the USB Type-C interface 112 is configured as a UFP, a role of the device 110 is a secondary device, and the device 100 may receive power supplied by a primary device.

The Type-C controller 113 may also include a CC1 pin and a CC2 pin. The CC1 pin or the CC2 pin of the Type-C controller 113 may be connected to the CC1 pin or the CC2 pin of the USB Type-C interface 112, so that the Type-C controller 113 may detect a signal on the CC1 pin or the CC2 pin of the USB Type-C interface 112, and determine role information of a peer end device based on the signal on the CC1 or the CC2.

The Type-C controller 113 may be configured to establish a connection between devices, and after establishing the connection between the devices, may further report role information of the devices during connection establishment to the processor 111. Optionally, the processor 111 may display the role information to a user, so that the user determines whether to change or maintain current roles.

Two terminals of the USB cable 130 are the same, and are both USB Type-C plugs. The USB Type-C plugs on the two terminals of the USB cable 130 may be respectively connected to USB Type-C sockets of the device 110 and the device 120, to establish a USB connection between the devices. There is one CC connection cable inside the USB cable 130. After the USB cable 130 is separately plugged into the USB Type-C sockets of the two devices, the CC1 pins or the CC2 pins of the two devices may establish a connection by using the CC connection cable of the USB cable 130. A connection mode between configuration channels of the device 110 and the device 120 may include combinations shown in Table 1.

TABLE 1

| Device 110 | Device 120 | CC connection mode |
|---|---|---|
| Forward CC1 insertion | Forward CC1 insertion | The CC1 of the device 110 is connected to the CC1 of the device 120. |
| Forward CC1 insertion | Reverse CC2 insertion | The CC1 of the device 110 is connected to the CC2 of the device 120. |
| Reverse CC2 insertion | Reverse CC2 insertion | The CC2 of the device 110 is connected to the CC2 of the device 120. |
| Reverse CC2 insertion | Forward CC1 insertion | The CC2 of the device 110 is connected to the CC1 of the device 120. |

Because the USB Type-C interface supports double-sided insertion, in other words, a function of CC1 is equivalent to a function of CC2, USB connections established between the devices by using any one of the foregoing connection modes achieve a same effect.

The input module 114 may be configured to implement interaction between the user and the device 110. The input module 114 may include a touch control panel, various sensor components (for example, a pressure sensor), a substantive input key, a microphone, or another external information capturing apparatus, for example, a camera. The substantive input key may include but is not limited to one or more of a physical keyboard, a function key (for example, a volume control key, or an on/off key), a track ball, a mouse, or a joystick.

The output module 115 includes but is not limited to an image output unit and a sound output unit. Optionally, the image output unit may include a single display or a plurality of displays having different sizes. The display may be a resistive display, a capacitive display, an infrared (Infrared) display, a surface acoustic wave display, or the like.

As shown in FIG. 1, the device 120 is similar to the device 110, modules in the device 120 respectively correspond to modules in the device 110, and details are not described herein again.

It should be understood that FIG. 1 describes an example of the application scenario according to the embodiments of the present invention. In an actual scenario, the device 110 or the device 120 may further include a plurality of USB Type-C interfaces, and the device 110 or the device 120 may further establish USB connections to a plurality of devices by using a plurality of USB cables. This is not limited in the embodiments of the present invention.

Figure 2:
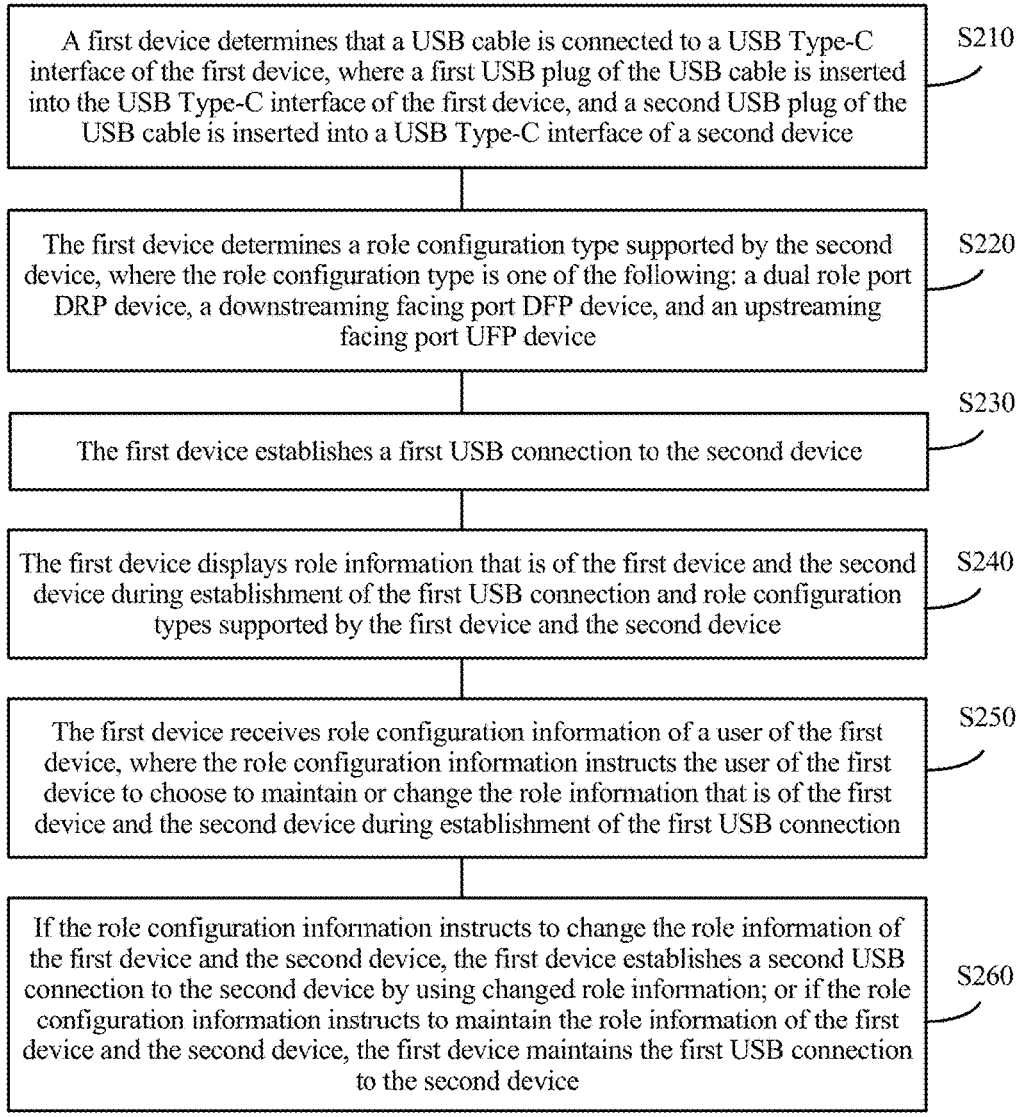
FIG. 2 is a schematic flowchart of a method for establishing a connection between devices having USB Type-C interfaces according to an embodiment of the present invention.

FIG. 2 is a schematic flowchart of a method 200 for establishing a connection between devices having USB Type-C interfaces according to an embodiment of the present invention. The method 200 is performed by a first device. As shown in FIG. 2, the method 200 includes the following steps:

S210. The first device determines that a USB cable is connected to a USB Type-C interface of the first device, where a first USB plug of the USB cable is inserted into the USB Type-C interface of the first device, and a second USB plug of the USB cable is inserted into a USB Type-C interface of a second device.

S220. The first device determines a role configuration type supported by the second device, where the role configuration type is one of the following: a dual role port device, a downstreaming facing port DFP device, or an upstreaming facing port UFP device.

S230. The first device establishes a first USB connection to the second device.

S240. The first device displays role information that is of the first device and the second device during establishment of the first USB connection and role configuration types supported by the first device and the second device.

S250. The first device receives role configuration information of a user of the first device, where the role configuration information instructs the user of the first device to choose to maintain or change the role information that is of the first device and the second device during establishment of the first USB connection.

S260. If the role configuration information instructs to change the role information of the first device and the second device, the first device releases the first USB connection from the first device, and establishes a second USB connection to the second device by using changed role information; or if the role configuration information instructs to maintain the role information of the first device and the second device, the first device maintains the first USB connection to the second device.

Specifically, the first device and the second device are two devices between which a USB connection is to be established, the two devices are both devices having USB Type-C interfaces, and the USB Type-C interfaces of the first device and the second device may establish a connection by using two USB plugs of the USB cable. In the prior art, if the first device and the second device are both DRP devices, when a USB connection is established between the devices, roles of the first device and the second device are randomly allocated. In other words, during establishment of the USB connection, the first device may be configured as a primary device, or may be configured as a secondary device. When the first device is a device at a relatively low battery level, if a role randomly allocated to the first device is a primary device, and a role randomly allocated to the second device is a secondary device, the first device needs to charge the second device. In this case, there is an awkward situation in which a device at a relatively low battery level charges a device at a relatively high battery level.

Figure 3:
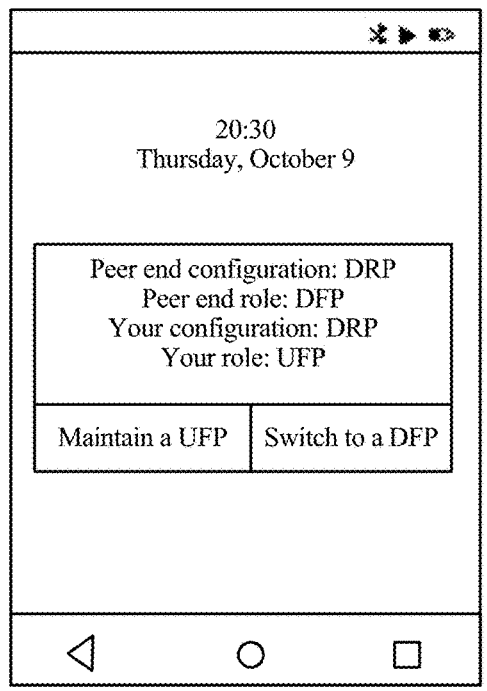
FIG. 3 is a schematic diagram of role information of a device displayed to a user according to an embodiment of the present invention.

To avoid the foregoing awkward situation, in this embodiment of the present invention, after the first device determines that the second device is connected to the USB Type-C interface of the first device by using the USB cable, the first device does not directly establish a USB connection between the first device and the second device, and instead, the first device postpones establishing the USB connection between the first device and the second device, and first detects the role configuration type supported by the second device. After the role configuration type supported by the second device is determined, the first device and the second device establish the first USB connection. In this case, roles that are of the first device and the second device during establishment of the USB connection are randomly configured. After the first USB connection is established, a Type-C controller of the first device reports, to a processor of the first device, the role information that is of the first device and the second device during establishment of the first USB connection. After the processor of the first device obtains the role information that is of the first device and the second device during establishment of the first USB connection, the first device may display, on an output device (for example, a display) of the first device, the role information of the first device and the second device and the role configuration types supported by the first device and the second device, so that the user of the first device configures the role information of the first device and the second device. The user of the first device may choose to maintain or change the role information of the first device and the second device. In this case, the processor of the first device may receive the role configuration information of the user of the first device for the first device and the second device. The role configuration information is determined by the user of the first device based on the role information that is of the first device and the second device during establishment of the first USB connection and the role configuration types supported by the first device and the second device. The role configuration information may instruct to maintain or change the role information of the first device and the second device. If the role configuration information instructs to change the role information of the first device and the second device, the first device may establish the second USB connection to the second device by using the changed role information. Alternatively, if the role configuration information instructs to maintain the role information of the first device and the second device, the first device may maintain the first USB connection to the second device. For example, as shown in FIG. 3, information displayed by the first device to the user is as follows: The role configuration types supported by the first device and the second device are both DRP devices, and the roles of the first device and the second device during establishment of the first USB connection are respectively a UFP device and a DFP device. After the first device displays the information to the user of the first device, the user of the first device may determine, based on statuses of battery levels of the first device and the second device, whether to maintain the role of the first device or maintain the role of the first device. If the user determines to change the role of the first device, the user of the first device may choose to "switch to a DFP", and the first device and the second device may re-establish the second USB connection by using the changed role information, in other words, the first device is a DFP device, and the second device is a UFP device.

Specifically, when the role configuration types of the first device and the second device are both DRP devices, in other words, the first device and the second device each may be configured as a primary device or a secondary device, if the role information that is of the first device and the second device during establishment of the first USB connection is that the first device is a primary device and the second device is a secondary device, the first device needs to supply power to the second device after the first USB connection is established. If the first device is a device at a relatively low battery level, the user of the first device may determine that the role configuration information is changing the role information that is of the first device and the second device during establishment of the first USB connection, in other words, the role of the first device is configured as a secondary device and the role of the second device is configured as a primary device. In this way, the second device at a relatively high battery level can charge the first device at a relatively low battery level. If the first device is a device at a relatively high battery level, the user of the first device may determine that the role configuration information is maintaining the role information that is of the first device and the second device during establishment of the first USB connection. In this way, the first device at a relatively high battery level can charge the second device at a relatively low battery level. Therefore, according to the method for establishing a connection between devices having USB Type-C interfaces in this embodiment of the present invention, the user may choose, based on statuses of the battery levels of the devices, to change or maintain the role information that is of the devices during connection establishment, so that an awkward situation in which a device at a relatively low battery level charges a device at a relatively high battery level is avoided.

Optionally, in an embodiment, the determining, by the first device, that a USB cable is connected to a USB Type-C interface of the first device includes:

if a level on a first ground pin of the USB Type-C interface of the first device changes from a first level to a second level, determining, by the first device, that the USB cable is connected to the USB Type-C interface, where the first level is higher than the second level, one terminal of the first ground pin is connected to the first level and one terminal of a switch, and the other terminal of the switch is connected to the second level; or if an infrared receiving apparatus in the USB Type-C interface of the first device cannot receive light emitted by an infrared emission apparatus, determining, by the first device, that the USB cable is connected to the USB Type-C interface of the first device.

The following describes, in detail with reference to specific embodiments, how the first device determines that the USB cable is connected to the USB Type-C interface of the first device.

Figure 4:
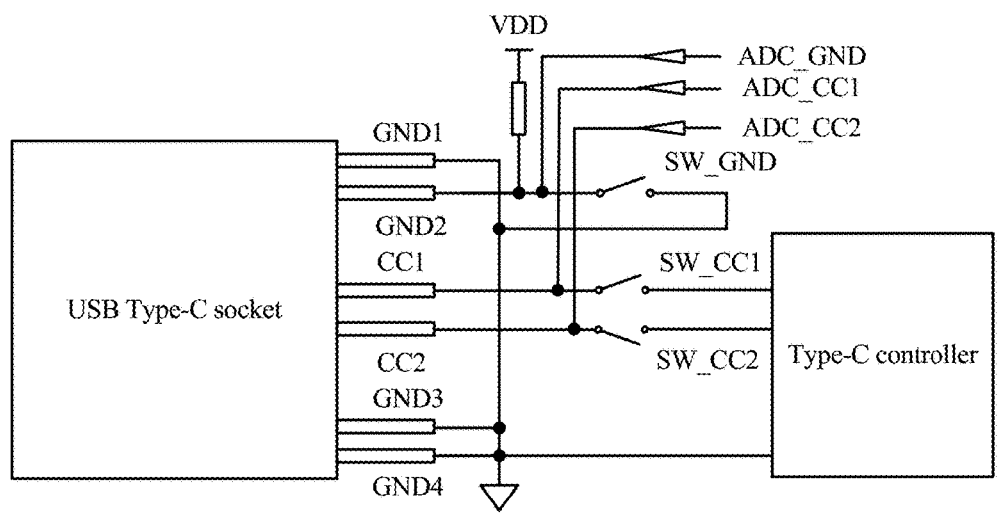
FIG. 4 is a schematic diagram of a method for determining whether a cable is connected to a USB Type-C interface according to an embodiment of the present invention.

As shown in FIG. 4, a ground pin GND2 of the first device may be connected to an ADC_GND device to detect whether the USB cable is connected to the USB Type-C interface of the first device. The ADC_GND is an analog to digital converter. One terminal of the pin GND2 is connected to a high level VDD by using a pull-up resistor, and is grounded by using an electronic switch SW_GND. A CC1 pin and a CC2 pin are respectively connected to a CC1 pin and a CC2 pin of a Type-C controller by using electronic switches SW_CC1 and SW_CC2. Before the first device determines the role configuration type of the second device, the switches SW_CC1 and SW_CC2 keep in a disconnected state. Therefore, the Type-C controller does not establish the USB connection between the first device and the second device. The following specifically describes how to detect, based on a detection circuit in FIG. 4, that the USB cable is connected to the USB Type-C interface of the first device.

When an external USB cable is not connected to the USB Type-C interface of the device, because when no USB cable is connected, the ADC_GND pin is pulled up to a high level by using the pull-up resistor, a level of a voltage detected by the ADC_GND is a high level VDD. A value of the high level VDD may be 5 V, 3.3 V, or the like, and this is not limited in this embodiment of the present invention.

When an external USB cable is connected to the USB Type-C interface, a level of a voltage detected by the ADC_GND is a low level, and the low level may be zero. Insertion of the external USB cable causes all GND pins of the USB Type-C interface to be connected, the pin GND2 on a USB Type-C socket that is pulled up to the VDD is also directly grounded by using the external USB cable, and therefore, the ADC_GND is grounded. Therefore, in this case, a level detected by the ADC_GND is a low level.

Therefore, in this embodiment of the present invention, it may be determined, based on a voltage status on a pin that is of the first device and that is used to detect whether a USB cable is connected, whether the USB cable is connected to the USB Type-C interface of the first device. Specifically, when a level of the voltage on the pin is a high level, it may be determined that the USB cable is not connected to the USB Type-C interface, or when a level of the voltage on the pin is a low level, it may be determined that the USB cable is connected to the USB Type-C interface. It should be understood that a value of the high level is related to the VDD, and a value of the low level is related to an impact that is caused to a voltage on the pin GND2 after the USB cable is connected. If the connection of the cable is equivalent to that the pin GND2 is grounded, the low level may be zero.

Optionally, in the embodiment shown in FIG. 4, after the first device determines, based on the detected voltage on the ADC_GND, that the external USB cable is inserted into, to ensure good grounding performance after the USB cable is connected, the switch SW_GND may be controlled to be closed, so that the pin GND2 pulled up to the VDD is also connected to the GND of the system, thereby ensuring a more reliable GND connection.

Figure 5:
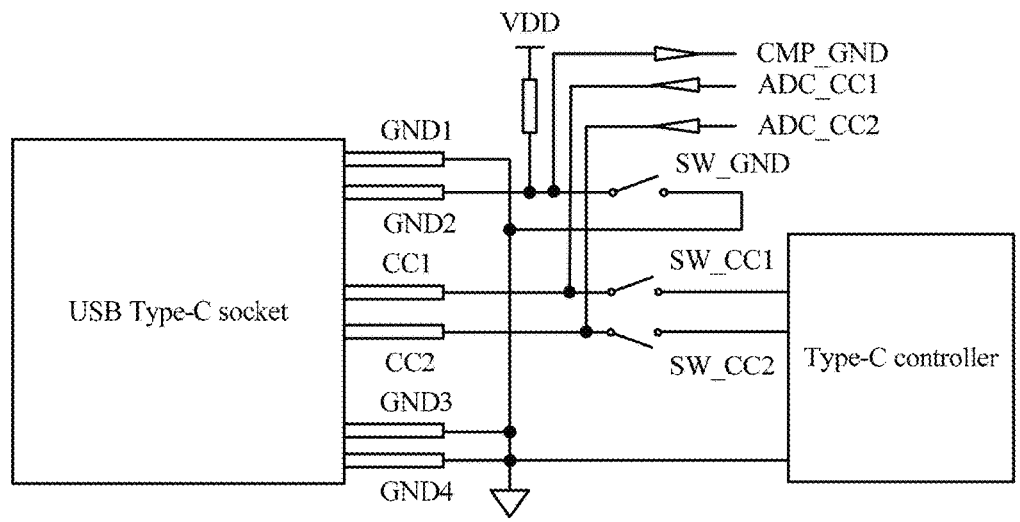
FIG. 5 is a schematic diagram of a method for determining whether a cable is connected to a USB Type-C interface according to an embodiment of the present invention.

Optionally, in an embodiment, as shown in FIG. 5, the ground pin GND2 of the first device may be connected to a CMP_GND device to detect whether the USB cable is connected to the USB Type-C interface. One terminal of the pin GND2 is pulled up to the high level VDD by using the pull-up resistor, and is grounded by using the electronic switch SW_GND. The CMP_GND device is a voltage comparator. An input voltage on the CMP_GND device is an output voltage on the pin GND2. When no USB cable is connected, an input voltage on the voltage comparator is the output voltage on the pin GND2, in other words, VDD. When an external USB cable is connected, the connection of the USB cable causes the pin GND2 to be directly grounded. In other words, the output voltage on the pin GND2 is GND in this case. Therefore, a voltage value between the GND and the VDD may be selected as a reference voltage of the voltage comparator. For example, the reference voltage of the voltage comparator may be set to ½ VDD. When no USB cable is connected, the input voltage on the voltage comparator is the VDD, and is greater than the reference voltage: ½ VDD. Therefore, an output value of the voltage comparator is a high level. When a USB cable is connected, the input voltage on the voltage comparator is the GND, and is less than the reference voltage: ½ VDD. Therefore, an output value of the voltage comparator is a low level. Therefore, when the output value of the voltage comparator is a high level, the first device may determine that no USB cable is connected, and when the output value of the voltage comparator is a low level, determine that a USB cable is connected.

Figure 6:
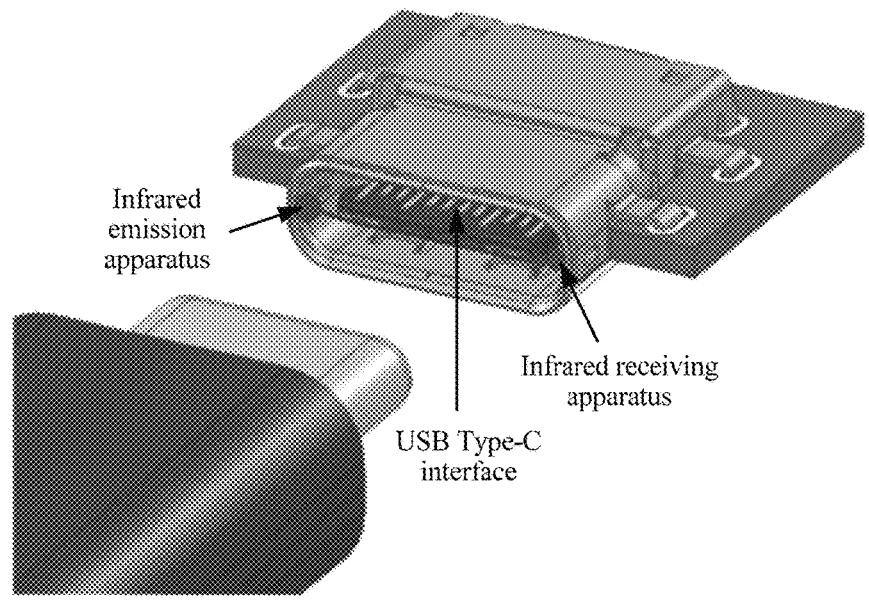
FIG. 6 is a schematic diagram of a method for determining whether a cable is connected to a USB Type-C interface according to an embodiment of the present invention.

Optionally, in an embodiment, as shown in FIG. 6, a set of infrared emission apparatus and infrared receiving apparatus may be disposed on the USB Type-C interface of the first device, to detect whether the USB cable is connected to the USB Type-C interface. A specific principle is as follows: When no USB cable is inserted into, light of an infrared emission apparatus may arrive at an infrared receiving apparatus; when a USB cable is inserted into, light of an infrared emission apparatus is blocked by a socket of the inserted USB cable and cannot arrive at an infrared receiving apparatus. Therefore, when the infrared receiving apparatus can receive the light emitted by the infrared emission apparatus, the first device may determine that no USB cable is connected, and when the infrared receiving apparatus cannot receive the light emitted by the infrared emission apparatus, determine that the USB cable is connected.

The foregoing describes, with reference to the embodiments shown in FIG. 4, FIG. 5, and FIG. 6, how to determine that the USB cable is connected to the USB Type-C interface of the first device, and the following describes in detail how the first device determines the role configuration type supported by the second device.

A method for determining, by the first device, the role configuration type supported by the second device may be based on the following principle: When a device establishes no USB Type-C connection, voltage features and resistance features of CC1 and CC2 pins are specifically shown in Table 2.

TABLE 2

| Device type | Voltage feature of the CC1/CC2 when no connection is established | Resistance feature of the CC1/CC2 when no connection is established | Method for determining a role configuration type supported by the device |
|---|---|---|---|
| No device | No feature | The CC1/CC2 has no ground resistance value | Null |
| UFP device | Levels of voltages on the CC1/CC2 are low levels | The CC1/CC2 has ground resistance | When it is detected that the CC1/CC2 has the ground resistance value, and the levels of the voltages are low levels, it may be determined that the device is a UFP device |
| DFP device | Levels of voltages on the CC1/CC2 are high levels | Resistance features do not need to be considered | When it is detected that the levels of the voltages on the CC1/CC2 are high levels, it may be determined that the device is a DFP |
| DRP device | Levels of voltages on the CC1/CC2 are in a waveform with variable voltages | Resistance features do not need to be considered | When it is detected that the levels of the voltages on the CC1/CC2 are in the waveform with variable voltages, it may be determined that the device is a DRP device |

It can be learned from Table 2 that a voltage feature or a resistance feature of the device varies with the device type. Therefore, the role configuration type supported by the device may be determined based on a difference of a voltage feature or a resistance feature of the CC1 or CC2 pin. For example, if the levels of the voltages on the CC1/CC2 are low levels when no connection is established, it may be determined that the device is a UFP device, or if the levels of the voltages on the CC1/CC2 are in a waveform with variable voltages, it may be determined that the device is a DRP device.

It should be understood that in Table 2, when no device connection is established, the levels of the voltages on the CC1/CC2 pin of the UFP device are low levels, the levels of the voltages on the CC1/CC2 pin of the DFP device are high levels, and the levels of the voltages on the CC1/CC2 pin of the DRP device are in a waveform with variable voltages. The high level and the low level are relative to each other. The high level may be a 3.3 V level, a 5 V level, or the like, and the low level may be zero, or a level less than zero, or the like. It should be noted that during actual measurement, usually, voltages on a pin of a device are not constant, are affected by an external environment, and may fluctuate slightly. If a fluctuation range is tolerable, it may be considered that the voltage is stabilized at a level.

Because the voltage or resistance feature in Table 2 is a feature shown when no connection is established, when the first device determines that a cable is connected to the USB Type-C interface of the first device, the first device needs to postpone establishing a USB connection between the first device and the second device, and detects voltages on the CC1 or CC2 pin of the USB Type-C interface of the first device when no device connection is established, to determine the role configuration type of the second device. Based on the foregoing principle, the first device needs to detect the voltages on the CC1 or CC2 pin, to determine the role configuration type of the second device. Because within one period (for example, 100 milliseconds), a DRP device may try to be a DFP device or a UFP device within a period of time, and when the DRP device tries to be a DFP device, a voltage feature is shown as high levels, or when the DRP device tries to be a UFP device, a voltage feature is shown as low levels, detection needs to be performed within at least one entire period to determine the role configuration type supported by the device. Within a detection time, if levels of the voltages on the CC1 or CC2 pin are always low levels (for example, the voltage is 0), it may be determined that the role configuration type of the second device is a UFP device, or only a USB cable is connected and no second device is connected; if the levels of the voltages on the CC1 or CC2 pin are always high levels (for example, 3.3 V or 5 V), it may be determined that the role configuration type of the second device is a DFP device; or if the levels of the voltages on the CC1 or CC2 pin are in a waveform with variable voltages (for example, the voltage is 3.3 V within a period of time in a detection period, and is 0 V within the other time), it may be determined that the role configuration type supported by the second device is a DRP device.

Optionally, in an embodiment, the determining, by the first device, a role configuration type supported by the second device includes:

determining, by the first device, that the second device is connected to the USB Type-C interface of the first device;

detecting, by the first device, voltages on a configuration channel CC pin of the USB Type-C interface of the first device; and if levels of the voltages within a preset time are high levels, determining that the role configuration type supported by the second device is a DFP device; or if levels of the voltages within the preset time are low levels, determining, by the first device, that the second device is a UFP device; or if levels of the voltages within the preset time are variable levels, determining that the role configuration type supported by the second device is a DRP device.

Optionally, in another embodiment, the determining, by the first device, a role configuration type supported by the second device includes:

detecting, by the first device, voltages on a configuration channel CC pin of the USB Type-C interface of the first device; and if levels of the voltages within a preset time are high levels, determining that the role configuration type supported by the second device is a DFP device; or if levels of the voltages within the preset time are low levels, determining, by the first device when the first device determines that the second device is connected to the USB Type-C interface of the first device, that the second device is a UFP device; or if levels of the voltages within the preset time are variable levels, determining that the role configuration type supported by the second device is a DRP device.

In other words, the first device may first determine that the second device is connected to the USB Type-C interface of the first device. Optionally, the first device may determine, based on a ground resistance value that is of the CC pin when no connection is established, whether the second device is connected. If the ground resistance value is 0, it is determined that no second device is connected, or if the ground resistance value is not 0, it is determined that the second device is connected. When it is determined that the second device is connected, the role configuration type of the second device is determined based on the voltages on the CC pin. Alternatively, the first device may directly determine the role configuration type of the second device based on the voltages on the CC pin. However, when the voltages on the CC pin are low levels, it further needs to be determined that whether this case is due to the fact that no second device is connected or the fact that a connected second device is a UFP device.

The following describes, in detail with reference to a specific embodiment, how the first device determines the role configuration type supported by the second device.

Specifically, as shown in FIG. 4 or FIG. 5, the CC1 and CC2 pins of the USB Type-C interface of the first device may be respectively connected to ADC_CC1 and ADC_CC2 devices, to detect voltages on the CC1 and CC2 pins. One terminal of each of the CC1 and CC2 pins of the USB Type-C interface is connected to the processor of the first device by using a USB Type-C socket, and is connected to the Type-C controller by using the two electronic switches: SW_CC1 and SW_CC2. After the first device determines that the USB cable is connected to the USB Type-C interface of the first device, the first device may determine, by detecting voltage statuses on the ADC_CC1 and the ADC_CC2 and with reference to the method for determining the role configuration type supported by the device in Table 2, the role configuration type supported by the second device.

Optionally, in an embodiment, the method 200 further includes:

before the first device determines the role configuration type of the second device, keeping, by the first device, configuration channel CC pins of the USB Type-C interface being disconnected from the Type-C controller of the first device; and when the first device determines the role configuration type of the second device, connecting, by the first device, the configuration channel CC pins of the USB Type-C interface and the Type-C controller of the first device.

During specific implementation, the first device may keep, within the preset time, the configuration channel CC pins of the USB Type-C interface being disconnected from the Type-C controller of the first device; and after the preset time expires, the first device controls the CC pins of the USB Type-C interface to connect to the Type-C controller.

Specifically, the preset time herein is a detection time in the foregoing embodiment. The preset time may be one period, or may be a plurality of periods. Because a voltage or resistance feature of the device in Table 2 is a feature shown when no connection is established, the first device needs to keep, when detecting the voltages on the CC1 and CC2 pins, in other words, within the preset time, the configuration channel CC pins of the USB Type-C interface being disconnected from the Type-C controller of the first device. In the embodiment shown in FIG. 4 or FIG. 5, the SW_CC1 and the SW_CC2 need to keep in a disconnected state. In this way, the Type-C controller is not to be connected to the CC1 or CC2 pin on the socket, and establishment of the USB connection between the first device and the second device is not to be started. After the first device completes detecting the voltages on the CC1 and CC2 pins, in other words, after the preset time expires, the first device connects the CC pins of the USB Type-C interface and the Type-C controller. In the embodiment shown in FIG. 4 or FIG. 5, the SW_CC1 and the SW_CC2 are closed.

In the foregoing embodiment, the CC pin may be the CC1 pin or the CC2 pin. Because a CC pin, of the device, connected to a CC connection cable of the USB cable is unknown during the connection of the USB cable, voltages on both the CC1 and CC2 pins of the device need to be detected. If levels of the detected voltages on one of the two CC pins are high levels and levels of the detected voltages on the other one of the two CC pins are low levels within the preset time, it may be determined that the CC pin on which levels of voltages are high levels is a pin connected to the USB cable, and therefore, it may be determined, based on the voltage feature in Table 2, that the second device is a DFP device. Alternatively, if levels of the detected voltages on one of the two CC pins are in the waveform with variable voltages and levels of the detected voltages on the other one of the two CC pins are low levels within the preset time, it may be determined that the CC pin on which the levels of the voltages are in the waveform with variable voltages is a pin connected to the USB cable, and therefore, it may be determined, based on the voltage feature in Table 2, that the second device is a DRP device. Alternatively, if levels of the detected voltages on the two CC pins are low levels within the preset time, the second device is a UFP device, or only the USB cable is inserted into the USB Type-C interface of the first device, and the second device is not connected to the USB Type-C interface.

The following describes, in detail with reference to specific embodiments, how to determine whether the second device is connected to the USB Type-C interface of the first device.

Figure 7:
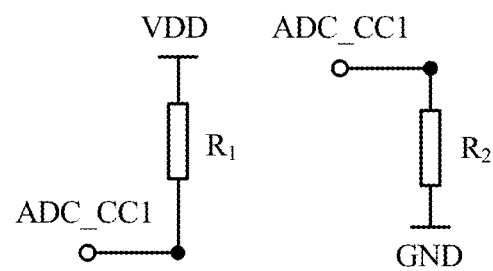
FIG. 7 is a schematic diagram of a method for determining whether a USB Type-C interface is connected to a device according to an embodiment of the present invention.
Figure 7:
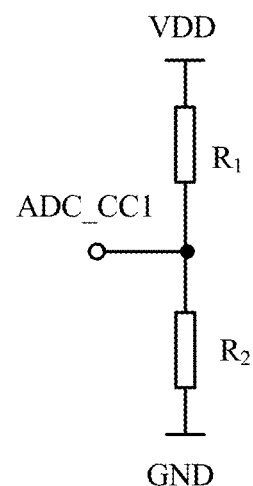

Optionally, in an embodiment, a detection circuit shown in FIG. 7 may be used to determine whether the second device is connected to the USB Type-C interface. As shown in FIG. 7, a detection circuit shown in solution 1 may be used to detect whether only the USB cable is connected to the USB Type-C interface and the second device is not connected to the USB Type-C interface. For example, first, an output terminal of the ADC_CC1 may be connected to the VDD by using a pull-up resistor $R_1$, to detect an output voltage on the ADC_CC1. Then, the output terminal of the ADC_CC1 is connected to the GND by using a pull-down resistor $R_2$, to detect an output voltage on the ADC_CC1 in this case. When the pull-up resistor is configured on the ADC_CC1, a level of an output voltage on the ADC_CC1 is a high level, or when the pull-down resistor is configured, a level of an output voltage on the ADC_CC1 is a low level, and it may be determined that only the USB cable is connected to the Type-C interface and the second device is not connected to the Type-C interface. When the second device is not connected to the USB Type-C interface, when the pull-up resistor is configured, the output voltage on the ADC_CC1 is connected to the VDD, and in this case, it is detected that the level of the output voltage on the ADC_CC1 is a high level; or when the pull-down resistor is configured, the output voltage on the ADC_CC1 is connected to the GND, and in this case, it is detected that the level of the output voltage on the ADC_CC1 is a low level. Therefore, if the output voltages on the ADC_CC1 and the ADC_CC2 are shown with the foregoing features (in other words, the levels of the output voltages on the ADC_CC1 and the ADC_CC2 are high levels when the output voltages are connected to the high level, and are low levels when the output voltages are connected to the low level), it may be determined that only the USB cable is connected to the USB Type-C interface and the second device is not connected to the USB Type-C interface.

Alternatively, a detection circuit in solution 2 in FIG. 7 may be used to detect whether only the USB cable is connected to the USB Type-C interface and the second device is not connected to the USB Type-C interface. In other words, a pull-up resistor $R_1$ is used to connect an output voltage on the ADC_CC1 to the VDD, and at the same time, a pull-down resistor $R_2$ is used to connect the output voltage on the ADC_CC1 to the GND. Therefore, when it is detected that the output voltage on the ADC_CC1 is $VDD \times R_2/(R_1+R_2)$, and an output voltage on the ADC_CC2 is shown with a same feature, it is determined that only the USB cable is connected to the USB Type-C interface and the second device is not connected to the USB Type-C interface.

Alternatively, if the output voltage on the ADC_CC1 or the ADC_CC2 keeps at a low level during configuration of a pull-up resistor or a pull-down resistor or simultaneous configuration of a pull-up resistor and a pull-down resistor, it may be determined that the first device is connected to the second device by using a CC pin that is always shown with a low level, and the role configuration type of the second device is a UFP device.

Optionally, in another embodiment, in this embodiment of the present invention, ground resistance of the CC1 and CC2 pins in FIG. 4 or FIG. 5 may be detected to determine whether only the USB cable is connected to the USB Type-C interface and the second device is not connected to the USB Type-C interface. Based on the resistance feature of the CC1/CC2 when no connection is established in Table 2, when neither the CC1 pin nor the CC2 pin has ground resistance, it may be determined that only the USB cable is connected to the USB Type-C interface of the first device and the second device is not connected to the USB Type-C interface of the first device. If one of the CC1 pin and the CC2 pin has a ground resistance value, it may be determined that the second device is connected to the USB Type-C interface of the first device. Further, the role configuration type supported by the second device may be determined, by detecting the voltage features of the CC1 and CC2 pins when the first device and the second device do not establish a connection, and based on the voltage feature of CC1/CC2 when no connection is established in Table 2.

In conclusion, the first device detects the role configuration type of the second device only when the first device determines that the second device is connected to the USB Type-C interface of the first device. A specific solution is as follows: First, it is determined that the USB cable is connected to the USB Type-C interface of the first device (the method in FIG. 4, FIG. 5, or FIG. 6 may be used for detection). Then, voltage statuses on the CC pins are detected after it is detected that the USB cable is connected. If levels of both voltages on two CC pins are not low levels, it may be determined that the second device is connected to the USB Type-C interface of the first device, or otherwise, if it is detected that levels of both voltages on two CC pins are low levels, it further needs to be detected whether the second device is connected to the USB Type-C interface. For example, a detection circuit in FIG. 7 may be used to further detect whether only the USB cable is connected to the USB Type-C interface and the second device is not connected to the USB Type-C interface, or a role configuration type of a connected second device is a UFP device (a specific solution is described above, and details are not described herein again). Alternatively, it may be determined, directly by detecting ground resistance values of two CC pins, whether the second device is connected to the USB Type-C interface of the first device, and when the ground resistance values are 0, it is determined that the second device is not connected to the USB Type-C interface of the first device, or when none of the ground resistance values is 0, it is determined that the second device is connected to the USB Type-C interface of the first device. Solution 2 is as follows: First, it is determined that the USB cable is connected to the USB Type-C interface of the first device (the method in FIG. 4, FIG. 5, or FIG. 6 may be used for detection). Then, it is detected that the second device is connected to the USB Type-C interface after it is detected that the USB cable is connected. Specifically, detection may be performed by using the detection circuit in FIG. 7 or by detecting ground resistance values of the two CC pins. After it is determined that the second device is connected, voltage statuses on the CC pins are detected, and the role configuration type of the second device is determined based on the voltage statuses.

Optionally, in an embodiment, that the first device establishes a USB connection to the second device based on the role configuration type supported by the first device and the role configuration type supported by the second device includes:

determining, by the first device based on the role configuration type supported by the first device and the role configuration type supported by the second device, role information that is of the first device and the second device during establishment of the USB connection; and establishing, by the first device, the USB connection to the second device based on the determined role information that is of the first device and the second device during establishment of the USB connection.

Specifically, after determining the role configuration type supported by the second device, the first device may determine, based on the role configuration types supported by the first device and the second device, the role information that is of the two devices during establishment of the USB connection. For example, if the role configuration type of the first device is a DFP device and the role configuration type of the second device is a UFP device, the first device may determine that the roles of the first device and the second device are respectively a DFP device and a UFP device during establishment of the USB connection, and then the first device and the second device may establish the USB connection by using the roles being a DFP device and a UFP device. For another example, if the role configuration type of the first device is a DRP device and the role configuration type of the second device is a UFP device, the first device may determine that the roles of the first device and the second device are respectively a DFP device and a UFP device during establishment of the USB connection, and then the first device and the second device may establish the USB connection by using the roles being a DFP device and a UFP device. Alternatively, if the role configuration types supported by the first device and the second device are both DRP devices, the first device may determine that roles of the first device and the second device are respectively a DFP device and a UFP device during establishment of the USB connection, or may determine that the roles of the first device and the second device are respectively a UFP device and a DFP device during establishment of the USB connection, and then the first device and the second device may establish the USB connection by using the determined roles.

Therefore, according to the method for establishing a connection between devices having USB Type-C interfaces in this embodiment of the present invention, the first device may display, to the user, the role configuration types of the first device and the connected second device and the role information that is of the first device and the second device during establishment of the first USB connection, so that the user chooses, based on battery level statuses of the devices, to maintain or change the role information of the devices. Therefore, an "awkward situation" in which a device at a relatively low battery level charges a device at a relatively high battery level due to random role allocation can be avoided.

Figure 8:
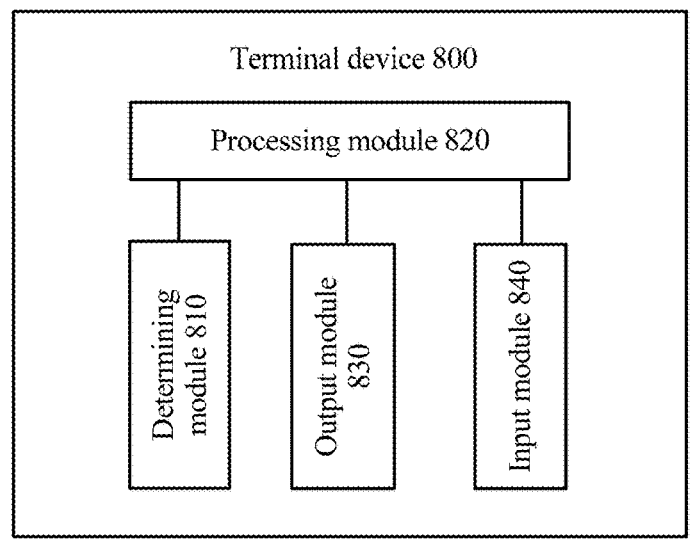
FIG. 8 is a schematic block diagram of a terminal device according to an embodiment of the present invention.

FIG. 8 is a schematic block diagram of a terminal device 800 according to an embodiment of the present invention. The terminal device 800 includes:

a determining module 810, configured to determine that a USB cable is connected to a USB Type-C interface of the terminal device, where a first USB plug of the USB cable is inserted into the USB Type-C interface of the first device, and a second USB plug of the USB cable is inserted into a USB Type-C interface of a second device, where the determining module 810 is further configured to determine a role configuration type supported by the second device, where the role configuration type is one of the following: a dual role port (DRP) device, a downstreaming facing port (DFP) device, or an upstreaming facing port (UFP) device;

a processing module 820, configured to establish a first USB connection to the second device;

an output module 830, configured to display role information that is of the terminal device and the second device during establishment of the first USB connection and role configuration types supported by the terminal device and the second device; and an input module 840, configured to receive role configuration information of a user of the terminal device, where the role configuration information instructs the user of the terminal device to choose to maintain or change the role information that is of the terminal device and the second device during establishment of the first USB connection, where the processing module 820 is further configured to: when the role configuration information instructs to change the role information of the terminal device and the second device, release the first USB connection, and establish a second USB connection to the second device by using changed role information; or when the role configuration information instructs to maintain the role information of the terminal device and the second device, maintain the first USB connection to the second device.

Specifically, a function of the determining module 810 may be performed by the processor of the device in FIG. 1, and a function of the processing module 820 may be performed by the processor or the Type-C controller of the device in FIG. 1, or may be performed by a combination of the processor and the Type-C controller. This is not limited in the present invention.

Optionally, in an embodiment, the processing module 820 is further configured to:

determine, based on the role configuration type supported by the terminal device and the role configuration type of the second device, roles that are of the terminal device and the second device during establishment of the USB connection; and establish the USB connection to the second device based on the determined roles that are of the terminal device and the second device during establishment of the USB connection.

Specifically, a function of the processing module 820 may be performed by the processor or the Type-C controller of the device in FIG. 1, or may be performed by a combination of the processor and the Type-C controller. This is not limited in the present invention.

Optionally, in an embodiment, the determining module 810 is specifically configured to:

determine that the second device is connected to the USB Type-C interface of the first device;

determine, based on voltages that are on a configuration channel CC pin of the USB Type-C interface of the first device within a preset time, the role configuration type supported by the second device; and if levels of the voltages within the preset time are high levels, determine that the role configuration type supported by the second device is a DFP device; or if levels of the voltages within the preset time are low levels, determine that the second device is a UFP device; or if levels of the voltages within the preset time are variable levels, determine that the role configuration type supported by the second device is a DRP device.

Specifically, a function of the determining module 810 may be performed by the processor in FIG. 1.

Optionally, in an embodiment, the determining module 810 is specifically configured to:

determine, based on voltages that are on a configuration channel CC pin of the USB Type-C interface of the terminal device within a preset time, the role configuration type supported by the second device; and if levels of the voltages within the preset time are high levels, determine that the role configuration type supported by the second device is a DFP device; or if levels of the voltages within the preset time are low levels, determine, when it is determined that the second device is connected to the USB Type-C interface of the terminal device, that the second device is a UFP device; or if levels of the voltages within the preset time are variable levels, determine that the role configuration type supported by the second device is a DRP device.

Specifically, a function of the determining module 810 may be performed by the processor in FIG. 1.

Optionally, in an embodiment, the processing module 820 is further configured to:

keep, within the preset time, configuration channel CC pins of the USB Type-C interface of the terminal device being disconnected from a Type-C controller of the terminal device; and after the preset time expires, control the CC pins of the USB Type-C interface to connect to the Type-C controller.

Specifically, a function of the processing module 820 may be independently performed by the processor in FIG. 1.

Optionally, in an embodiment, the determining module 810 is specifically configured to:

when a level on a first ground pin of the USB Type-C interface of the terminal device changes from a first level to a second level, determine that the USB cable is connected to the USB Type-C interface, where the first level is higher than the second level, one terminal of the first ground pin is connected to the first level and one terminal of a switch, and the other terminal of the switch is connected to the second level; or when an infrared receiving apparatus in the USB Type-C interface of the terminal device cannot receive light emitted by an infrared emission apparatus, determine that the USB cable is connected to the USB Type-C interface of the terminal device.

Specifically, a function of the determining module 810 may be independently performed by the processor in FIG. 1.

Therefore, the terminal device in this embodiment of the present invention may display, to the user, the role configuration types of the terminal device and the connected second device, and the role information that is of the terminal device and the second device during establishment of the first USB connection, so that the user chooses, based on battery level statuses of the devices, to maintain or change the role information of the devices. Therefore, an "awkward situation" in which a device at a relatively low battery level charges a device at a relatively high battery level due to random role allocation can be avoided.

Figure 9:
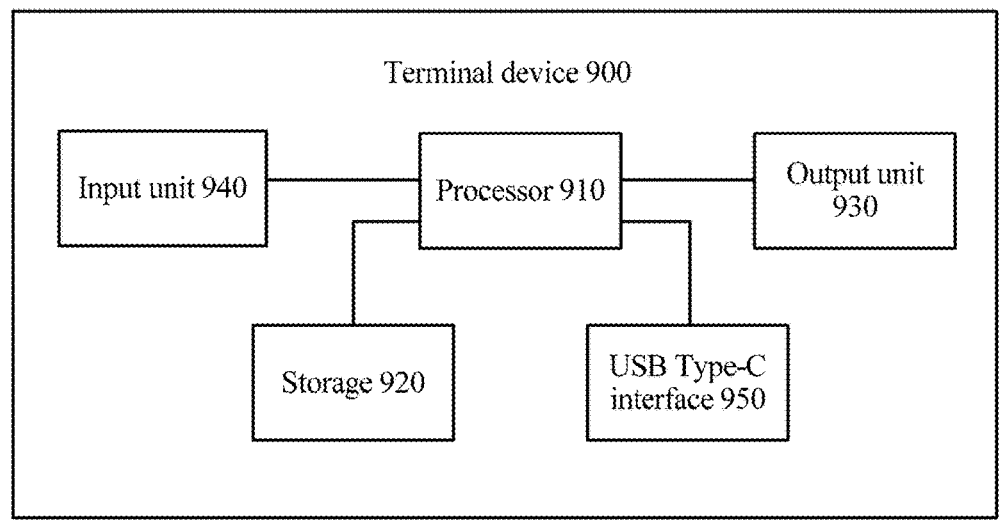
FIG. 9 is a schematic block diagram of a terminal device according to another embodiment of the present invention.

FIG. 9 is a schematic block diagram of a terminal device 900 according to an embodiment of the present invention. The terminal device 900 includes modules performing the method 200 for establishing a connection between devices having Universal Serial Bus (USB) Type-C interfaces in the embodiment of the present invention. The following describes in detail the terminal device with reference to FIG. 9. As shown in FIG. 9, the terminal device 900 includes a processor 910, a storage 920, an output unit 930, an input unit 940, and a USB Type-C interface 950.

The processor 910 may be configured to perform the method 200 in FIG. 2 in the embodiment of the present invention. A function of the processor 910 is equivalent to functions of the determining module 810 and the processing module 820 in the terminal device 800 in the embodiment shown in FIG. 8.

The processor 910 may be further configured to perform corresponding functions of the processor and the Type-C controller of the device shown in FIG. 1. The function of the processor 910 may be independently performed by the processor or the Type-C controller of the device shown in FIG. 1, or may be performed by a combination of the processor and the Type-C controller of the device shown in FIG. 1. For example, functions, for example, the first device determines that a USB cable is connected to the USB Type-C interface of the first device and the first device determines a role configuration type supported by a second device, may be independently performed by the processor shown in FIG. 1, and a function, for example, the first device establishes a USB connection to the second device, may be performed by a combination of the processor and the Type-C controller of the first device.

The processor 910 is a control center of the terminal device, may connect various parts of an entire portable electronic device by using various interfaces and lines, and perform various functions of the electronic device and/or process data by running or executing a software program and/or module stored in the storage and invoking data stored in the storage. The processor unit may include an integrated circuit (Integrated Circuit, IC for short), for example, may include a single packaged IC, or may include a plurality of packaged ICs having a same function or having different functions. For example, the processor unit may include only a central processing unit (Central Processing Unit, CPU for short), or may include a combination of a GPU, a digital signal processor (Digital Signal Processor, DSP for short), and a control chip (for example, a baseband chip) in a communications unit.

The storage 920 may be configured to store a software program and a module, and the processor performs various function applications and data processing of the electronic device by running the software program and the module that are stored in the storage. The storage mainly includes a program storage area and a data storage area. The program storage area may store an operating system, and an application program required by at least one function, for example, a sound playing program and an image playing program. The data storage area may store data (such as audio data, and an address book) created based on use of the electronic device. In a specific implementation of the present invention, the storage may include a volatile storage, for example, a nonvolatile random access memory (English full name: Nonvolatile Random Access Memory, NVRAM for short), a phase change random access memory (English full name: Phase Change RAM, PRAM for short), or a magnetoresistive random access memory (English full name: Magnetoresistive RAM, MRAM for short), or may include a nonvolatile storage, for example, at least one magnetic storage component, an electrically erasable programmable read-only memory (English full name: Electrically Erasable Programmable Read-Only Memory, EEPROM for short), or a flash memory, for example, a NOR flash memory (NOR flash memory) or a NAND flash memory (NAND flash memory). The nonvolatile storage stores an operating system and an application program that are executed by the processor. The processor loads, from the nonvolatile memory, a running program and data to a memory, and stores digital content in a mass storage apparatus. The operating system includes various components and/or drives configured to control and manage routine system tasks, for example, memory management, storage device control, and power management, and facilitate communication between various software and hardware. In an implementation of the present invention, the operating system may be an Android system of Google, an IOS system developed by Apple, or a Windows operating system/Windows Phone system developed by Microsoft, or may be an embedded operating system such as Vxworks.

The output unit 930 may include but is not limited to an image output unit and an audio output unit. The image output unit may include a filter and an amplifier, configured to filter and amplify a video output by the processor. The audio output unit may include a digital to analog converter, configured to convert an audio signal output by the processor from a digital format to an analog format. Optionally, the image output unit may include a single display or a plurality of displays having different sizes. The display may be a resistive display, a capacitive display, an infrared (Infrared) display, a surface acoustic wave display, or the like, for example, a liquid crystal display (English full name: Liquid Crystal Display, LCD for short), organic light-emitting diode (English full name: Organic Light-Emitting Diode, OLED for short), a field emission display (English full name: Field Emission Display, FED for short), an electrophoretic (Electrophoretic) display, or a display using an interferometric modulation of light technology (Interferometric Modulation of Light). In this embodiment of the present invention, the output unit 930 may be configured to display role information that is of the terminal device and the second device and that is obtained by the processor 910, and role types supported by the terminal device and the second device, so that a user of the terminal device determines, based on the displayed information, whether to change or maintain the role information of the terminal device and the second device.

The input unit 940 may be configured to implement interaction between the user and the terminal device. For example, the input unit 940 may be configured to receive digit or character information entered by the user, to generate signal input related to user setting or function control. In this embodiment of the present invention, the input unit 940 may be used by the user of the terminal device to enter role configuration information for the terminal device and the second device. The role configuration information may instruct to change or maintain the role information of the terminal device and the second device. In this embodiment of the present invention, the input unit 940 may include a touch control panel, various sensor components (for example, a pressure sensor), a substantive input key, a microphone, or another external information capturing apparatus, for example, a camera. The substantive input key may include but is not limited to one or more of a physical keyboard, a function key (for example, a volume control key, or an on/off key), a track ball, a mouse, or a joystick. The microphone may be configured to collect voice entered by the user or an environment, and convert the voice into an electrical signal, or a command that can be executed by the processor. However, this is not limited in this embodiment of the present invention.

Therefore, the terminal device in this embodiment of the present invention may display, to the user, the role configuration types of the terminal device and the connected second device, and the role information that is of the terminal device and the second device during establishment of the first USB connection, so that the user chooses, based on battery level statuses of the devices, to maintain or change the role information of the devices. Therefore, an "awkward situation" in which a device at a relatively low battery level charges a device at a relatively high battery level due to random role allocation can be avoided.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processor, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing a connection between devices having Universal Serial Bus (USB) Type-C interfaces, wherein the method comprises:
   determining, by a first device, that a USB cable is connected to a USB Type-C interface of the first device, wherein a first USB plug of the USB cable is inserted into the USB Type-C interface of the first device, and a second USB plug of the USB cable is inserted into a USB Type-C interface of a second device;

determining, by the first device, a role configuration type supported by the second device, wherein the role configuration type is one of the following: a dual role port (DRP) device, a downstreaming facing port (DFP) device, or an upstreaming facing port (UFP) device;

establishing, by the first device, a first USB connection to the second device;

displaying, by the first device, role information of the first device and the second device during establishment of the first USB connection and role configuration types supported by the first device and the second device;

receiving, by the first device, role configuration information of a user of the first device, wherein the role configuration information instructs the user of the first device to choose to change the role information of the first device and the second device during establishment of the first USB connection; and establishing, by the first device, a second USB connection to the second device by using changed role information.

2. The method according to claim 1, wherein the determining, by the first device, a role configuration type supported by the second device comprises:

determining, by the first device, that the second device is connected to the USB Type-C interface of the first device;

detecting, by the first device, voltages on a configuration channel (CC) pin of the USB Type-C interface of the first device within a preset time; and if levels of the voltages within the preset time are high levels, determining that the role configuration type supported by the second device is a DFP device;

if levels of the voltages within the preset time are low levels, determining, by the first device, that the second device is a UFP device; or if levels of the voltages within the preset time are variable levels, determining that the role configuration type supported by the second device is a DRP device.

3. The method according to claim 1, wherein the determining, by the first device, a role configuration type supported by the second device comprises:

detecting, by the first device, voltages on a configuration channel (CC) pin of the USB Type-C interface of the first device within a preset time; and if levels of the voltages within the preset time are high levels, determining that the role configuration type supported by the second device is a DFP device;

if levels of the voltages within the preset time are low levels, determining, by the first device, if it is determined that the second device is connected to the USB Type-C interface of the first device, that the second device is a UFP device; or if levels of the voltages within the preset time are variable levels, determining that the role configuration type supported by the second device is a DRP device.

4. The method according to claim 2, wherein the method further comprises:

keeping, by the first device within the preset time, configuration channel (CC) pins of the USB Type-C interface being disconnected from a Type-C controller of the first device; and connecting, by the first device, the CC pins of the USB Type-C interface and the Type-C controller after the preset time expires.

5. The method according to claim 1, wherein the determining, by a first device, that a USB cable is connected to a USB Type-C interface of the first device comprises:

if a level on a first ground pin of the USB Type-C interface of the first device changes from a first level to a second level, determining, by the first device, that the USB cable is connected to the USB Type-C interface, wherein the first level is higher than the second level, and one terminal of the first ground pin is connected to the first level; or if an infrared receiving apparatus in the USB Type-C interface of the first device cannot receive light emitted by an infrared emission apparatus, determining, by the first device, that the USB cable is connected to the USB Type-C interface of the first device.

6. The method according to claim 3, wherein the method further comprises:

keeping, by the first device within the preset time, configuration channel (CC) pins of the USB Type-C interface being disconnected from a Type-C controller of the first device; and connecting, by the first device, the CC pins of the USB Type-C interface and the Type-C controller after the preset time expires.

7. The method according to claim 4, wherein the determining, by a first device, that a USB cable is connected to a USB Type-C interface of the first device comprises:

if a level on a first ground pin of the USB Type-C interface of the first device changes from a first level to a second level, determining, by the first device, that the USB cable is connected to the USB Type-C interface, wherein the first level is higher than the second level, and one terminal of the first ground pin is connected to the first level; or if an infrared receiving apparatus in the USB Type-C interface of the first device cannot receive light emitted by an infrared emission apparatus, determining, by the first device, that the USB cable is connected to the USB Type-C interface of the first device.

8. A terminal device, comprising:

a USB Type-C interface;

at least one processor; and a non-transitory computer-readable storage medium coupled to the at least one processor and storing programming instructions for execution by the at least one processor, the programming instructions instruct the at least one processor to:

determine that a USB cable is connected to the USB Type-C interface, wherein a first USB plug of the USB cable is inserted into the USB Type-C interface of the terminal device, and a second USB plug of the USB cable is inserted into a USB Type-C interface of a second device;

determine a role configuration type supported by the second device, wherein the role configuration type is one of the following: a dual role port (DRP) device, a downstreaming facing port (DFP) device, or an upstreaming facing port (UFP) device;

establish a first USB connection to the second device;

display role information of the terminal device and the second device during establishment of the first USB connection and role configuration types supported by the terminal device and the second device;

receive role configuration information of a user of the terminal device, wherein the role configuration information instructs the user of the terminal device to choose to change the role information of the terminal device and the second device during establishment of the first USB connection; and establish a second USB connection to the second device by using changed role information.

9. The terminal device according to claim 8, wherein the programming instructions instruct the at least one processor to:
- determine that the second device is connected to the USB Type-C interface of the terminal device;
- determine, based on voltages that are on a configuration channel (CC) pin of the USB Type-C interface of the terminal device within a preset time, the role configuration type supported by the second device; and
- if levels of the voltages within the preset time are high levels, determine that the role configuration type supported by the second device is a DFP device;
- if levels of the voltages within the preset time are low levels, determine that the role configuration type supported by the second device is a UFP device; or
- if levels of the voltages within the preset time are variable levels, determine that the role configuration type supported by the second device is a dual role port device.

10. The terminal device according to claim 8, wherein the programming instructions instruct the at least one processor to:
- determine, based on voltages that are on a configuration channel CC pin of the USB Type-C interface of the terminal device within a preset time, the role configuration type supported by the second device; and
- if levels of the voltages within the preset time are high levels, determine that the role configuration type supported by the second device is a DFP device;
- if levels of the voltages within the preset time are low levels, determine, if it is determined that the second device is connected to the USB Type-C interface of the terminal device, that the second device is a UFP device; or
- if levels of the voltages within the preset time are variable levels, determine that the role configuration type supported by the second device is a DRP device.

11. The terminal device according to claim 9, wherein the programming instructions instruct the at least one processor to:
- keep, within the preset time, configuration channel CC pins of the USB Type-C interface being disconnected from a Type-C controller; and
- connect the CC pins of the USB Type-C interface and the Type-C controller after the preset time expires.

12. The terminal device according to claim 8, wherein the programming instructions instruct the at least one processor to:
- in response to determining that a level on a first ground pin of the USB Type-C interface of the terminal device changes from a first level to a second level, determine that the USB cable is connected to the USB Type-C interface, wherein the first level is higher than the second level, and one terminal of the first ground pin is connected to the first level; or
- in response to determining that an infrared receiving apparatus in the USB Type-C interface of the terminal device cannot receive light emitted by an infrared emission apparatus, determine that the USB cable is connected to the USB Type-C interface of the terminal device.

13. The terminal device according to claim 10, wherein the programming instructions instruct the at least one processor to:
- keep, within the preset time, configuration channel (CC) pins of the USB Type-C interface being disconnected from a Type-C controller; and
- connect the CC pins of the USB Type-C interface and the Type-C controller after the preset time expires.

14. The terminal device according to claim 11, wherein the programming instructions instruct the at least one processor to:
- in response to determining that a level on a first ground pin of the USB Type-C interface of the terminal device changes from a first level to a second level, determine that the USB cable is connected to the USB Type-C interface, wherein the first level is higher than the second level, and one terminal of the first ground pin is connected to the first level; or
- in response to determining that an infrared receiving apparatus in the USB Type-C interface of the terminal device cannot receive light emitted by an infrared emission apparatus, determine that the USB cable is connected to the USB Type-C interface of the terminal device.

* * * * *